United States Patent [19]
Azegami et al.

[11] Patent Number: 5,950,019
[45] Date of Patent: Sep. 7, 1999

[54] ZOOM LENS CAMERA

[75] Inventors: Kazuyoshi Azegami, Tokyo; Takamitsu Sasaki, Saitama-ken; Kazunori Ishizuka, Kanagawa-ken, all of Japan

[73] Assignee: Asahi Kogaku Kogyo Kabushiki Kaisha, Tokyo, Japan

[21] Appl. No.: 09/084,102

[22] Filed: May 26, 1998

[30] Foreign Application Priority Data

May 23, 1997 [JP] Japan .................................. 9-133666

[51] Int. Cl.[6] .................................................. G03B 17/00
[52] U.S. Cl. ............................ 396/72; 396/436; 396/462; 396/542
[58] Field of Search .............................. 396/72, 436, 462, 396/542, 435

[56] References Cited

U.S. PATENT DOCUMENTS 5,510,868  4/1996  Nomura et al. .................. 396/436
5,717,969  2/1998  Miyamoto et al. ............... 396/535

*Primary Examiner*—W. B. Perkey
*Attorney, Agent, or Firm*—Greenblum & Bernstein, P.L.C.

[57] ABSTRACT

A zoom lens camera includes an image size varying frame to switch the image size between a standard image plane and a laterally elongated image plane, a linear movement barrel, an FPC board which connects a shutter unit and a controller, and a light-interception plate which is secured to a rear end of the linear movement barrel. The light-interception plate is provided with a rearwardly projecting planar portion which at least partly overlaps the image size varying frame as viewed in an optical axis direction, regardless of the position of the image size varying frame. Further the planar portion is provided with an FPC board receiving portion which supports the FPC board along the cylindrical surface of the linear movement barrel.

5 Claims, 6 Drawing Sheets

ZOOM LENS CAMERA

BACKGROUND OF THE INVENTION

1. Field of the Invention

The present invention relates to a zoom lens camera and in particular it relates to a zoom lens camera having an image size varying frame which is adapted to switch an image plane.

2. Description of the Related Art

In a camera having an extension type zoom lens barrel, a shutter unit provided in a zoom lens barrel is connected to a controller provided in a camera body through a flexible printed circuit (FPC) board which extends along the inner peripheral surface of the lens barrel. The lens barrel is moved forward or backward along the optical axis during the zooming operation. To this end, the FPC board is arranged to permit the lens barrel to extend or retract. Consequently, the FPC board can be loosened. In the kind of the zoom lens barrel, in order to prevent the loosened FPC board from hanging down into the light path, thus resulting in an interruption of the photographing operation, a receptacle or a pull mechanism which receives or pulls the loosened portion of the FPC board is provided on a lens frame or the like. However, in some conventional cameras, it is difficult to provide a space for accommodating such a receptacle. Moreover, the pull mechanism complicates the structure of the zoom lens barrel.

In a camera in which the size of the image plane is switched between a standard size and a laterally elongated size (panoramic size) in which upper and lower edges of a standard size are cut, the image size is varied by means of a movable image size varying frame which is moved in front of an aperture. In a zoom lens barrel, it is preferable that the rear end of the lens barrel in a retracted position be located as rearward as possible, i.e., as close to the aperture as possible to reduce the thickness of the camera when it is not in use. However, if the rear end of the lens barrel is located too close to the aperture in the retracted position, the components of the lens barrel may interfere with the image size varying frame which is provided in front of the aperture when the retracted position is deviated rearward from the correct position. If this occurs, it is impossible to extend or retract the lens barrel or to switch the image size. To avoid this, the rear end of the lens barrel in the retracted position is located sufficiently away from the size varying frame or a restriction plate is provided between the movable barrel member and the image size varying frame to restrict the movement of the rear end of the lens barrel. Thus, no interference occurs between the size varying frame and the barrel member. However, these solutions reduce the space utilization efficiency. Moreover, there is a danger of the FPC board protruding rearward and interfering with the image size varying frame.

The zoom lens barrel is often provided at its rear end with a light-interception plate which moves together with the lens barrel. The outer shape of the light-interception plate can be relatively freely designed so long as it is provided with a predetermined shape of opening.

SUMMARY OF THE INVENTION

It is an object of the present invention to provide a zoom lens camera in which no interference between the image size varying frame and the barrel member occurs and it is possible to prevent the FPC board from being loosened by a simple mechanism which does not need a large space for accommodation thereof.

To achieve the object mentioned above, according to the present invention, there is provided a zoom lens camera comprising an aperture frame having an aperture that defines a standard image size; an image size varying frame which is provided in front of the aperture frame which is moved in a predetermined direction to interrupt a part of the aperture to thereby switch the image size between the standard image size and a laterally elongated image size; a linear movement barrel provided in a lens barrel of the zoom lens camera, the linear movement barrel being movable in the direction of the optical axis in front of the image size varying frame; an FPC board which connects a shutter unit provided in the lens barrel and a controller provided in a camera body and which is partly supported along the cylindrical surface of the linear movement barrel; and a light-interception plate which is secured to a rear end of the linear movement barrel and which is provided with an opening through which object light passes; wherein the light-interception plate is provided with a rearwardly projecting planar portion which at least partly overlaps the image size varying frame as viewed in a direction parallel with the optical axis, regardless of the position of the image size varying frame, and wherein, the planar portion being provided with an FPC board receiving portion which supports the FPC board along the cylindrical surface of the linear movement barrel.

Preferably, the rearwardly projecting planar portion lies in a plane normal to the optical axis.

With this arrangement, if the retraction position (accommodation position) of the zoom lens barrel is deviated rearward from a correct position, the image size varying frame comes into surface contact with the rearwardly projecting planar portion of the light-interception plate, and hence no interference of the image size varying frame with the barrel members. Moreover, since the FPC board is supported by the rear end of the linear guide barrel, no loosening of the FPC board in the direction toward the optical axis occurs.

According to an embodiment of the invention, the linear movement barrel is a first linear movement barrel which is guided by the camera body to move linearly, and the lens barrel further comprises a second linear movement barrel which is guided in the first linear movement barrel to move linearly. In this embodiment, the FPC board can be composed of a first straight portion which extends forward along the inner peripheral surface of the first linear movement barrel, a return straight portion which is bent rearward at the front end of the first straight portion and extends linearly, a second straight portion which extends along the inner peripheral surface of the second linear movement barrel, and a U-shaped portion which connects the return straight portion and the second straight portion and which protrudes rearward from the second linear barrel. It is preferable that the planar portion of the light-interception plate be located on a rearward extension of the U-shaped portion of the FPC board.

Consequently, if the U-shaped portion protrudes rearward, since the U-shaped portion is received by the rearwardly projecting planar portion, no interference of the image size varying frame with the FPC board takes place.

The FPC board receiving portion preferably includes a cut-away portion which extends in the radial and inward direction from the outer edge of the light-interception plate and an FPC board receiving surface which is provided at the base end of the cut-away portion and which lies in a plane parallel with the optical axis. The cut-away portion guides the FPC board so that the latter can be stably supported by the FPC board receiving surface.

According to another aspect of the present invention, there is provided a zoom lens camera comprising an image size varying frame to switch an image size between a standard image size and a laterally elongated image size; a linear movement barrel that is movable in the direction of the optical axis in front of the image size varying frame; an FPC board that connects a shutter unit provided in a lens barrel and a controller provided in a camera body, part of the FPC board being supported along a cylindrical surface of the linear movement barrel; a light-interception plate that is secured to the rear end of the linear movement barrel; a rearwardly projecting planar portion that is provided on the light-interception plate, the rearwardly projecting planer portion being located at a place where the rearwardly projecting planer portion can abut against the image size varying frame when the linear movement barrel moves toward the image size varying frame, regardless of the position of the image size varying frame; and an FPC board receiving portion provided on the planar portion, the FPC board receiving portion supporting the FPC board along the cylindrical surface of the linear movement barrel.

The present disclosure relates to subject matter contained in Japanese Patent Application No.09-133666 (filed on May 23, 1997) which is expressly incorporated herein by reference in its entirety.

BRIEF DESCRIPTION OF THE DRAWINGS

The invention will be discussed below in detail with reference to the accompanying drawings, in which.

DESCRIPTION OF THE PREFERRED EMBODIMENT

Figure 1:
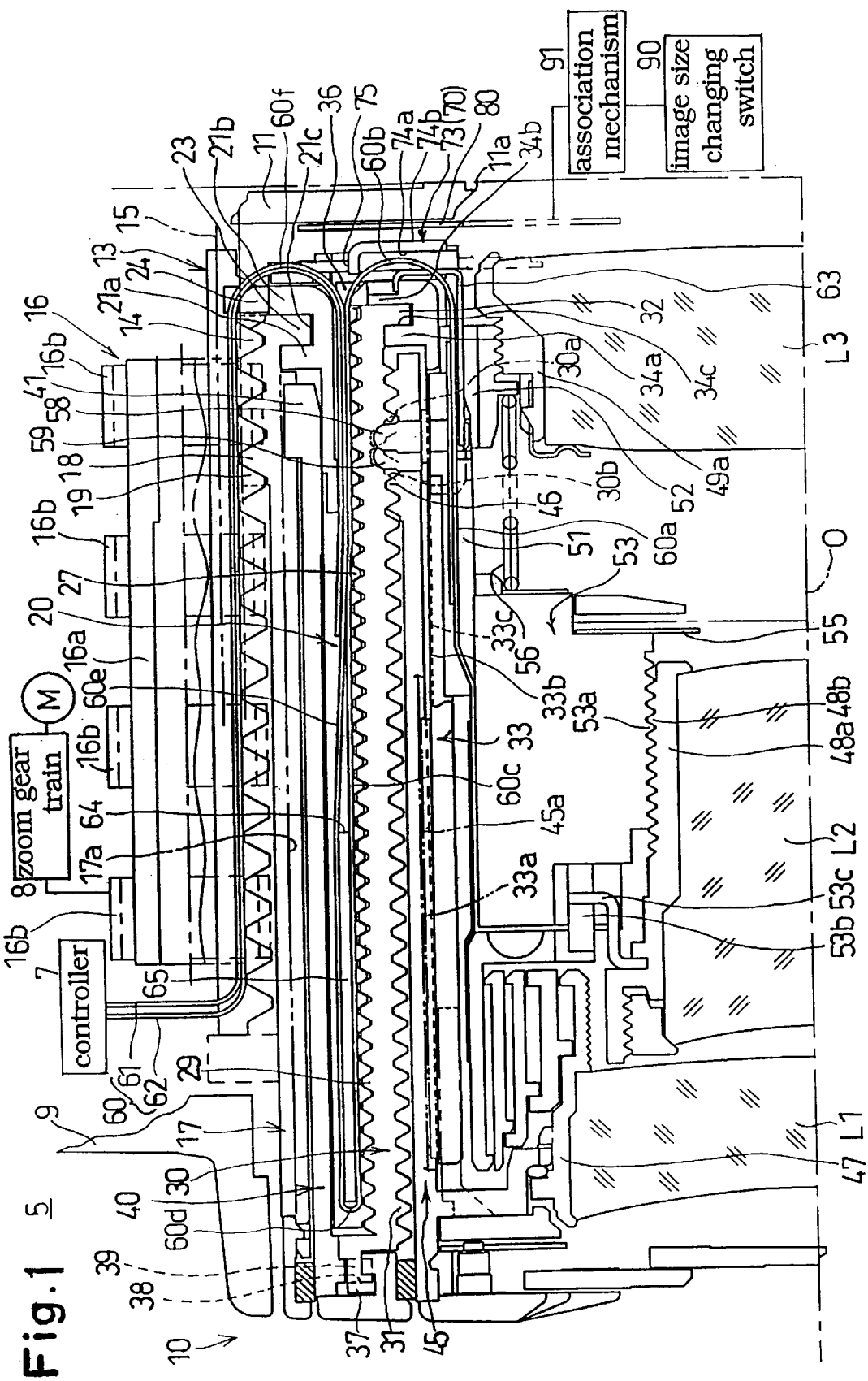
FIG. 1 is a longitudinal sectional view of a zoom lens barrel of a zoom lens camera in a retracted position, according to the present invention, in which a zoom lens barrel is retracted in the camera body.
Figure 2:
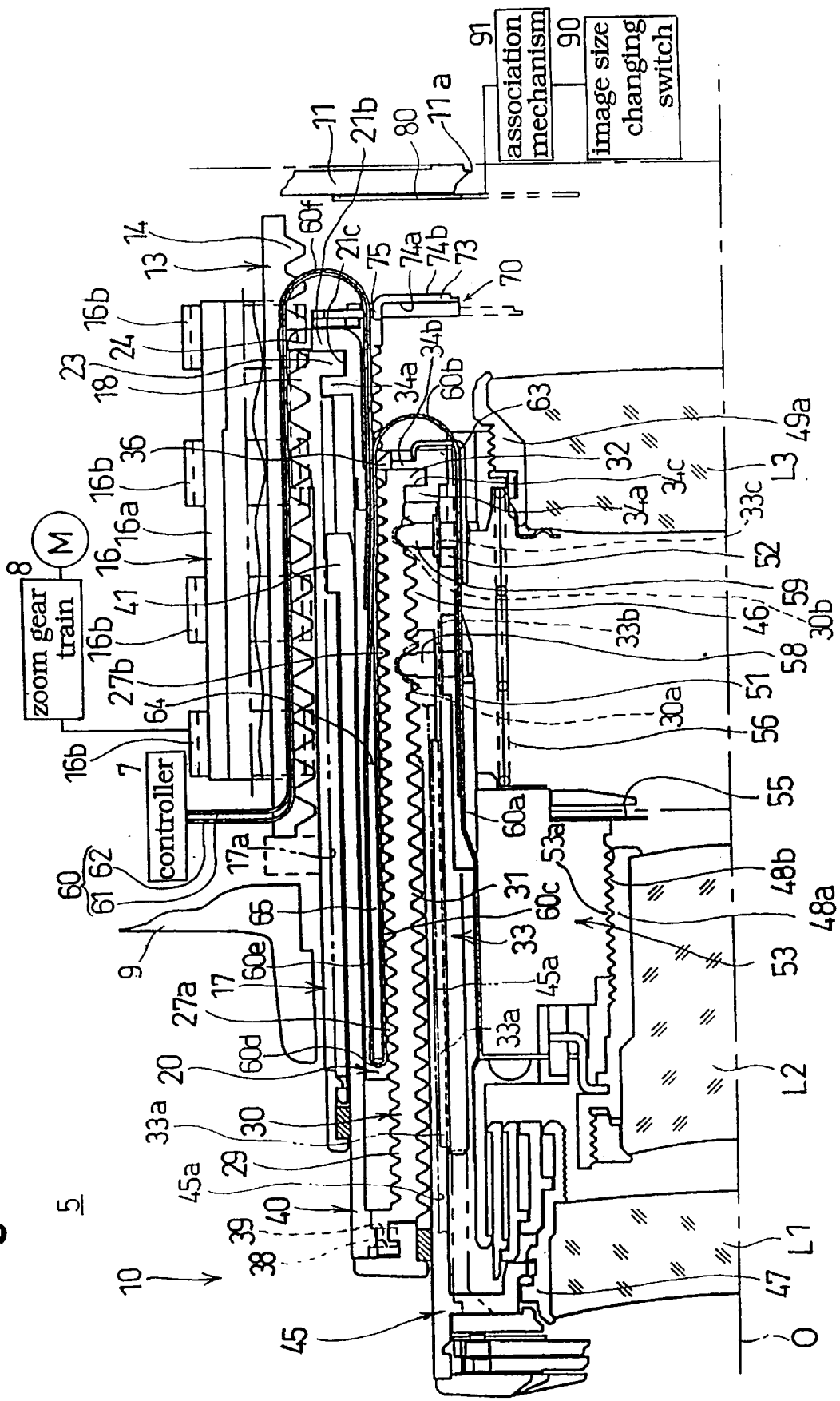
FIG. 2 is a longitudinal sectional view of a zoom lens barrel shown in FIG. 1, at a wide-angle extremity.
Figure 3:
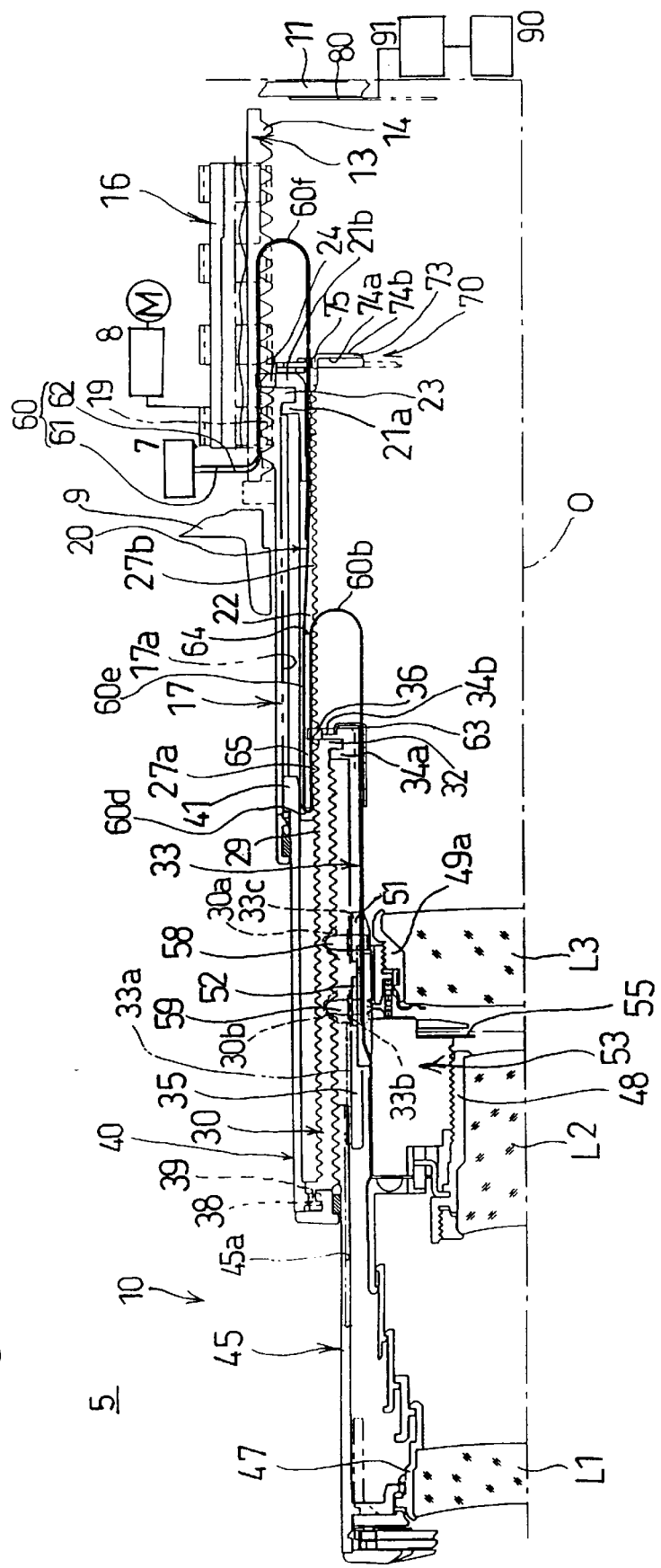
FIG. 3 is a longitudinal sectional view of a zoom lens barrel shown in FIG. 1, at a telephoto extremity.

In FIGS. 1 through 3, a zoom lens barrel 10 is provided on a camera body 9 of a camera 5. The zooming operation is carried out by varying the distance between three lens groups consisting of first, second, and third lens groups L1, L2, and L3 and the distance between a film surface and each lens group. The focusing operation is carried out by moving the second lens group L2 in a direction parallel with the optical axis O. The whole structure and operation of the zoom lens barrel 10 will be discussed below.

An aperture plate 11 is secured in a camera body 9 so that the edge of the aperture plate 11 on the optical axis side defines an aperture 11a which determines the exposure area for a film. A stationary barrel 13 is secured to the camera body 9 in front of the aperture plate 11. The stationary barrel 13 is provided on the inner peripheral surface thereof with a female helicoid (internal helicoid) 14 and a plurality of linear movement guide grooves 15 (FIG. 1) which extend in parallel with the optical axis O. Note that only one guide groove 15 is shown in FIG. 1.

The stationary barrel 13 is provided on its outer peripheral surface with a zoom gear 16 secured thereto. The zoom gear 16 is comprised of a shaft portion 16a which extends in parallel with the optical axis O and which is supported so as to rotate relative to the stationary barrel 13, and a plurality of pinions 16b which are provided on the shaft portion 16a at a predetermined distance in the axial direction. The stationary barrel 13 is provided with cut-away portions (not shown) through which the teeth of the pinions 16b project into the inside of the stationary barrel 13. The drive force of a zoom motor M provided in the camera body 9 is transmitted to the pinions 16b through a zoom gear train 8.

The female helicoid 14 of the stationary barrel 13 is engaged by a male helicoid (external helicoid) 18 formed on the outer peripheral surface of a first outer barrel 17. The width of the male helicoid 18 in the direction of the optical axis is such that the male helicoid 18 is not exposed to the outside when the first outer barrel 17 is extended to the most advanced position. The first outer barrel 17 is provided, on the outer peripheral surface thereof on which the male helicoid 18 is formed, with a plurality of outer peripheral gears 19. The outer peripheral gears 19 are engaged by the pinions 16b of the zoom gear 16.

A first linear movement guide ring (first linear movement barrel) 20 is provided in the first outer barrel 17. The first linear movement guide ring 20 is provided, on the outer peripheral surface at the rear end thereof, with a pair of radially projecting parallel flanges 21a, 21b that are spaced from one another to define an annular groove 21c therebetween, whose center is located on the optical axis O. The first outer barrel 17 is provided, on the inner peripheral surface at the rear end thereof, with a plurality of engaging projections 23 (only one of which is shown in FIG. 1) that project inward (toward the optical axis O) and that are spaced from one another in the circumferential direction. The thickness of the engaging projections 23 is such that the engaging projections are snugly fitted in the annular groove 21c of the first linear movement guide ring 20 in the axial direction O but can slide therein in the circumferential direction. Consequently, when the engaging projections 23 are fitted in the annular groove 21c, the first outer barrel 17 and the first linear movement guide ring 20 are relatively rotatably connected so as not to relatively move in the axial direction. The first linear movement guide ring 20 is provided at the rear end thereof with a plurality of linear movement guide projections 24 at different circumferential positions, that project outward in the radial direction. Note that only one linear movement guide projection 24 is shown in FIG. 1. The linear movement guide projections 24 are slidably engaged in a plurality of linear movement guide grooves 15 formed on the inner peripheral surface of the stationary barrel 13. Consequently, the first linear movement guide ring 20 is moved together with the first outer barrel 17 in the axial direction without rotating relative to the stationary barrel 13 in the circumferential direction about the optical axis O. Thus, the linear movement of the first linear movement guide ring 20 is guided.

Moreover, the first linear movement guide ring 20 is provided with a light-interception plate 70 secured to the rear end thereof. The light-interception plate 70 which is one of the most significant features of the present invention will be discussed hereinafter.

The first outer barrel 17 and the first linear movement guide ring 20 constitute a first feed stage (extension stage)

of the zoom lens barrel 10. In the first feed stage, when the zoom gear 16 is rotated in a predetermined direction by the zoom motor M, the first outer barrel 17 is rotated through the pinion 16b and the outer peripheral gear 19, so that the first outer barrel 17 is advanced from the stationary barrel 13 in accordance with the relationship between the female helicoid 14 and the male helicoid 18. At the same time, the first linear movement guide ring 20 is moved together with the first outer barrel 17 relative to the stationary barrel 13 in the axial direction while being linearly guided.

The first linear movement guide ring 20 is equipped on its inner peripheral surface with a female helicoid (internal helicoid) 27 whose inclination direction is the same as that of the female helicoid 14. The first linear movement guide ring 20 is provided on the inner peripheral surface thereof with a plurality of linear movement guide grooves (not shown) at different circumferential positions, that extend in parallel with the optical axis O. A drive cam ring 30 is provided in the first linear movement guide ring 20. The drive cam ring 30 is provided on the outer peripheral surface thereof with a male helicoid (external helicoid) 29 which engages with the female helicoid 27. The male helicoid 29 is formed on the entire peripheral surface of the drive cam ring 30. Also, the drive cam ring 30 is provided on its entire inner peripheral surface with a female helicoid (internal helicoid) 31 whose inclination direction is opposite to that of the male helicoid 29. The drive cam ring 30 is also equipped, on the inner peripheral surface at the rear end thereof, with a plurality of engaging projections (only one of which is shown in FIG. 1) 32 that are spaced from one another in the circumferential direction and that protrude in the radial and inward direction (toward the optical axis O).

A second linear movement guide ring (second linear movement barrel) 33 is provided in the drive cam ring 30. The second linear movement guide ring 33 is provided, on the outer peripheral surface at the rear end thereof, with a pair of radially projecting parallel flanges 34a, 34b that are spaced from one another to define an annular groove 34c therebetween whose center is located on the optical axis O. When the engaging projections 32 provided on the inner peripheral surface of the drive cam ring 30 are fitted in the annular groove 34c, the drive cam ring 30 and the second linear movement guide ring 33 are relatively rotatably connected so as not to relatively move in the axial direction. The second linear movement guide ring 33 is provided at the rear end thereof with a plurality of linear movement guide projections 36 that project outward in the radial direction at different circumferential positions. The linear movement guide projections 36 are slidably engaged in the linear movement guide grooves (not shown) formed on the inner peripheral surface of the first linear movement guide ring 20. Note that only one linear movement guide projection 36 is shown in the drawings. Consequently, he second linear movement guide ring 33 is linearly guided in the first linear movement guide ring 20 so as not to move relative to the drive cam ring 30 in the direction of the optical axis.

A second outer barrel 40 is located between the first outer barrel 17 and the first linear movement guide ring 20 to surround the outer periphery of the drive cam ring 30. A plurality of rotation transmission projections 41 (only one of which is shown in FIG. 1) provided on the outer peripheral surface of the second outer barrel 40 at the rear end thereof are slidably fitted in a plurality of rotation transmission grooves 17a (only one of which is shown in FIG. 1) formed on the inner peripheral surface of the first outer barrel 17 and extending in parallel with the optical axis O. Thus, the second outer barrel 40 is guided so as not to relatively rotate but so as to move relative to the first outer barrel 17 along the optical axis O.

The drive cam ring 30 is provided on the front end thereof with a rib 37 having three cut-away portions 38. The second outer barrel 40 is equipped, on the inner peripheral surface at the front end thereof, with a plurality of engaging projections 39 (only one of which is shown in FIG. 1) that can be engaged in the cut-away portions 38 of the rib 37 and that are spaced from one another in the circumferential direction. The drive cam ring 30 and the second outer barrel 40 are interconnected so as to move together in the direction of the optical axis and to rotate together when the engaging projections 39 are engaged in the cut-away portions 38. Consequently, the second outer barrel 40 is rotated in association with the first outer barrel 17 to transmit the rotation to the drive cam ring 30.

The drive cam ring 30, the second outer barrel 40 and the second linear movement guide ring 33 constitute a second feed stage (extension stage) of the zoom lens barrel 10. When the first outer barrel 17 which constitutes the first feed stage is rotated and extended from the stationary barrel 13, the second outer barrel 40 is rotated in association with the first outer barrel 17 due to the engagement between the rotation transmission grooves 17a and the rotation transmission projections 41. The drive cam ring 30 to which the rotation of the second outer barrel 40 is transmitted is advanced from the first linear movement guide ring 20 together with the second outer barrel 40, while rotating relative to the stationary barrel 13 in the same direction as the first outer barrel 17, in accordance with the engagement between the female helicoid 27 and the male helicoid 29. At the same time, the second linear movement guide ring 33 is moved in the direction of the optical axis together with the drive cam ring 30 while being guided by the first linear movement guide ring 20 in accordance with the engagement between the linear movement guide projections 36 and the linear movement guide grooves formed on the inner peripheral surface of the first linear movement guide ring 20.

A third outer barrel 45 is provided in the drive cam ring 30. The second linear movement guide ring 33 is located in the third outer barrel 45. The third outer barrel 45 is guided to move only in the direction of the optical axis relative to the camera body 9 through the second linear movement guide ring 33. To linearly guide the outer member of the lens barrel, such as the third outer barrel 45, a conventional guide mechanism can be employed. In the illustrated embodiment, generally U-shaped guide rails 45a and corresponding guide projections 33a are provided on the inner peripheral surface of the third outer barrel 45 and on the outer peripheral surface of the second linear movement guide ring 33, respectively. The guide projections 33a and the guide rails 45a in which the guide projections 33a can be slidably fitted extend in the direction of the optical axis, so that the relative sliding movement therebetween causes the third outer barrel 45 to linearly move. Note that only parts of the guide rails 45a and 33a are shown in the drawings.

The third outer barrel 45 is provided on the outer peripheral surface at the rear end thereof with a male helicoid (external helicoid) 46 which engages with the female helicoid 31 formed on the inner peripheral surface of the drive cam ring 30. Since the third outer barrel 45 is linearly guided by the second linear movement guide ring 33, when the rotation of the drive cam ring 30 takes place, the third outer barrel 45 is advanced relative to the drive cam ring 30 in accordance with the male helicoid 46 and the female helicoid 31. Namely, the third outer barrel 45 constitutes a third feed stage (extension stage) of the lens barrel. The length of the male helicoid 46 in the direction of the optical axis is such that the male helicoid 46 is not exposed to the outside when the third outer barrel 45 is extended to the maximum extension position. The first lens frame 47 which holds the first lens group L1 is secured to the third outer barrel 45.

The second linear movement guide ring 33 is provided with a plurality of axially extending lens guide slits which are formed by cutting away part of the peripheral surface thereof. The lens guide slits are composed of a plurality of second lens guide slits 33b which are adapted to guide the second lens group L2 and a plurality of third lens guide slits 33c which are adapted to guide the third lens group L3. The second lens guide slits 33b and the third lens guide slits 33c are alternately arranged in the circumferential direction. Sliding plates 51 and sliding plates 53 are slidably fitted in the second lens guide slits 33b and the third lens guide slits 33c, respectively. In FIGS. 1 through 3, the sliding plates 51 are located in front of the sliding plates 52, as viewed in the direction perpendicular to the plane of the drawings. Likewise, the second lens guide slits 33b are located in front of the third lens guide slits 33c. Although only one guide slit 33b, one guide slit 33c, one sliding plate 51 and one sliding plate 52 are shown in the drawings, there are a plurality of guide slits 33b and 33c that are circumferentially spaced from one another and a plurality of sliding plates 51 and 52 that are circumferentially spaced.

The sliding plates 51 are formed integrally with a shutter block 53. Thus, the shutter block 53 is capable of moving only in the direction of the optical axis relative to the third outer barrel 45 which supports the first lens group L1 and the second linear movement guide ring 33. The shutter block 53 is provided with a threaded axial hole (internal thread) 53a in which an external thread 48b of the second lens frame 48a having the second lens group L2 is screw-engaged.

The shutter block 53 includes therein a focusing motor which, upon focusing, drives the second lens frame 48a due to the engagement between the internal thread 53a and the external thread 48b through a drive pin 53b and an association projection 53c in accordance with an object distance signal supplied from a focusing device to thereby move the second lens group L2 in the direction of the optical axis. The shutter block 53 is provided with shutter blades 55 which function also as a diaphragm and which are opened and closed in accordance with an object brightness signal. The shutter block 53 receives drive signals for driving the shutter and the focusing operation from a controller 7 which is provided in the camera body 9 through an FPC (Flexible Printed Circuit) board 60.

The sliding plates 52 are formed integrally with the third lens frame 49a which holds the third lens group L3. Consequently, the third lens frame 49a is movable relative to the second linear movement guide ring 33 and the third outer barrel 45 which supports the first lens group L1 only in the direction of the optical axis. The third lens frame 49a and the shutter block 53 are independently slidable along the optical axis. A backlash absorbing compression spring 56 is provided between the shutter block 53 (second lens frame 48a) and the third lens frame 49a, so that the shutter block 53 and the third lens frame 49a are biased forward and rearward in the direction of the optical axis, respectively.

The sliding plates 51 integral with the shutter block 53 and the sliding plates 52 integral with the third lens frame 49a are provided with radial guide pins 58 and 59, respectively. The drive cam ring 30 is provided on its inner peripheral surface with a plurality of cam grooves 30a and 30b corresponding to the guide pins, which are formed by cutting away a part of the female helicoid 31. The guide pins 58 and 59 are slidably fitted in the cam grooves 30a and 30b, respectively. The cam grooves 30a for the guide pins 58 and the cam grooves 30b for the guide pins 59 extend nonlinearly in the oblique directions with respect to the optical axis. Consequently, the second lens group L2 (shutter block 53) and the third lens group L3 (third lens frame 49a) are relatively moved along the optical axis through the guide pins 58 and 59 when the drive cam ring 30 rotates. Namely, as can be seen in FIGS. 1 through 3, the second lens group L2 is moved forward in the second feed stage (drive cam ring 30) in accordance with the movement of the zoom lens barrel 10 from the retracted position to the wide-angle extremity or from the wide-angle extremity to the telephoto extremity. The third lens group L3 is moved rearward in the second feed stage in accordance with the movement of the zoom lens barrel 10 from the retracted position to the wide-angle extremity and is moved forward in accordance with the movement of the zoom lens barrel from the wide-angle extremity to the telephoto extremity, respectively.

The zoom lens barrel 10 operates as follows. If the zoom motor M is driven in the extension direction of the zoom lens barrel in the retracted position shown in FIG. 1 or in the wide-angle extremity shown in FIG. 2, the first outer barrel 17 is rotated and advanced from the stationary barrel 13. Consequently, the first linear movement guide ring 20 is moved forward together with the first outer barrel 17 while being linearly guided by the stationary barrel 13. As a result, the drive cam ring 30 is advanced together with the second outer barrel 40 from the first linear movement guide ring 20 while rotating in the same direction as the first outer barrel 17. At the same time, the linear movement of the second linear movement guide ring 33 in the axial direction, together with the drive cam ring 30 occurs. When the rotation of the drive cam ring 30 takes place, the second lens group L2 and the third lens group L3 are moved forward in the direction of the optical axis while varying the distance between the second and third lens groups L2 and L3 within the second feed stage, in accordance with the engagement between the guide pins 58 and 59 and the corresponding cam grooves 30a and 30b. Moreover, the third outer barrel 45 which is linearly guided by the second linear movement guide ring 33 is moved forward in the direction of the optical axis in accordance with the rotation of the drive cam ring 30, so that the first lens group L1 is moved forward relative to the second and third lens groups L2 and L3. If the zoom motor M is driven in the retraction direction of the lens barrel at the telephoto extremity shown in FIG. 3, the zoom lens barrel 10 operates in the way opposite the above-mentioned operation.

As can be seen from the foregoing, in the three-stage feed (extension) type zoom lens barrel 10, the zooming operation is carried out by varying the distance of the first, second and third lens groups L1, L2 and L3 from the film surface and by varying the distance between the lens groups in combination, and the focusing operation is carried out by moving the second lens group L2 in the direction of the optical axis by means of the focusing motor which is driven at a predetermined zoom position, respectively.

Figure 4:
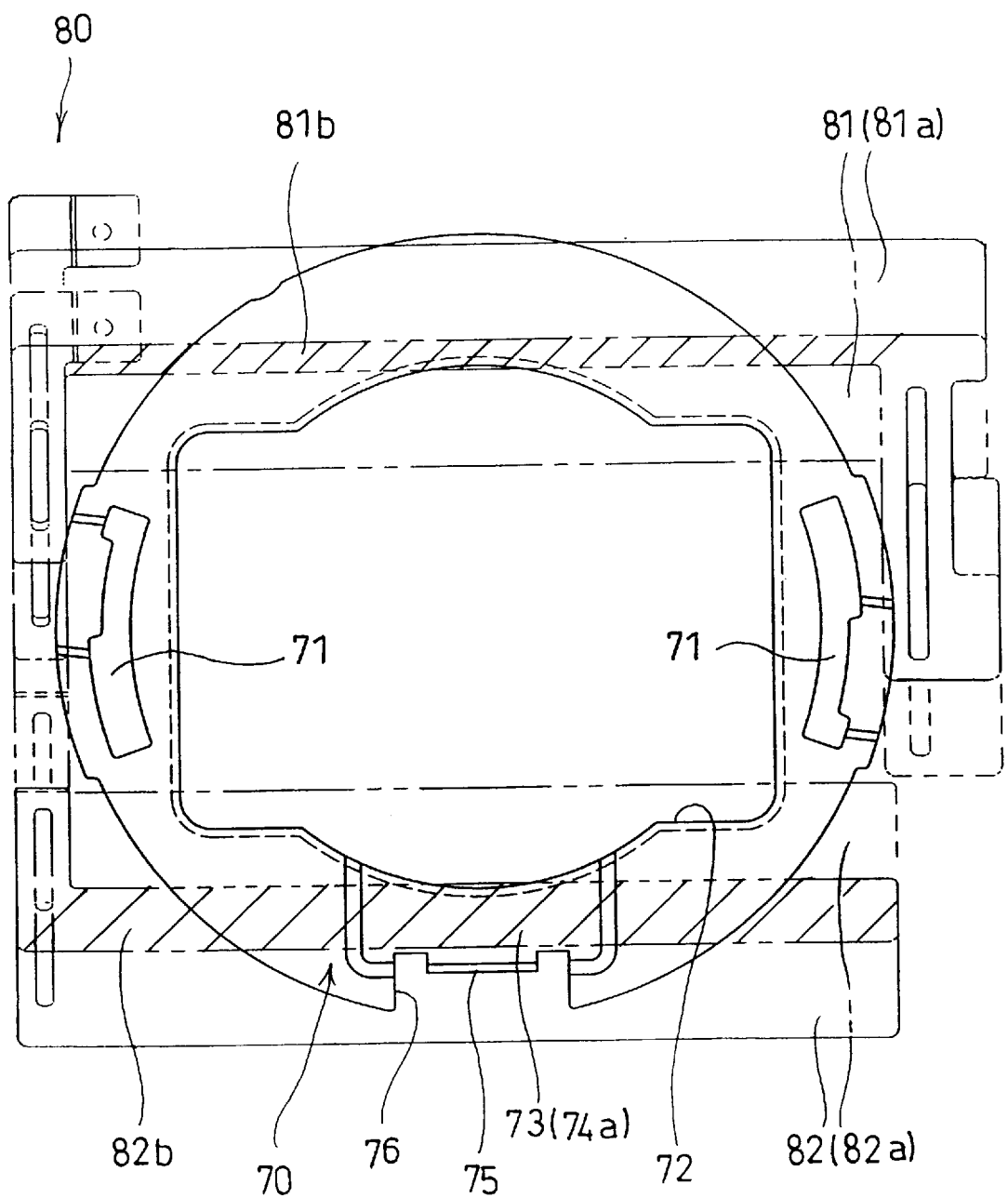
FIG. 4 is a front elevational view of a light-interce ption plate and an image size varying frame, of a lens barrel to show a positional relationship therebetween.
Figure 5:
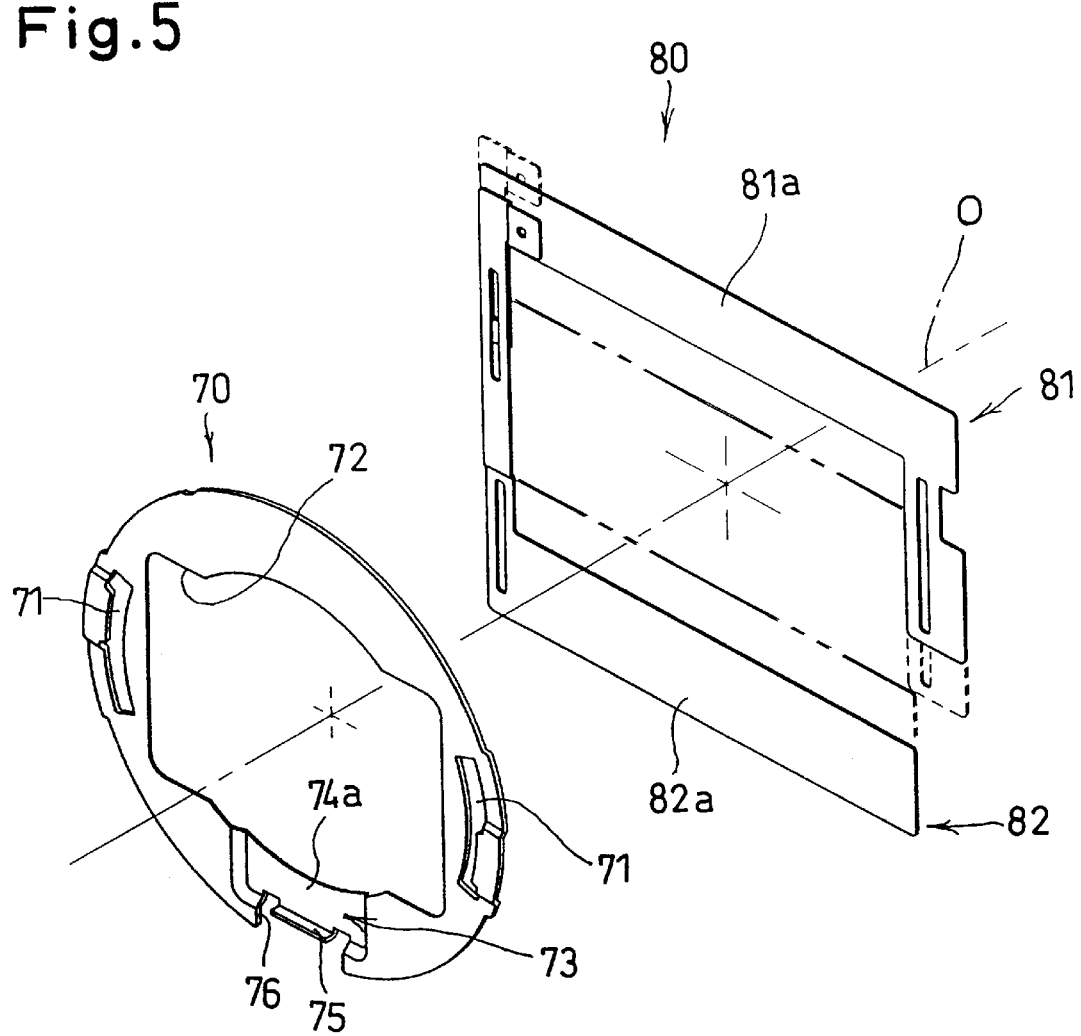
FIG. 5 is a perspective view of a light-interception plate and an image size varying frame shown in FIG. 4, viewed from front; and, FIG. 6 is a perspective view of a light-interception plate and an image size varying frame, viewed from behind, in which the arrangement shown in FIG. 5 is inverted.
Figure 6:
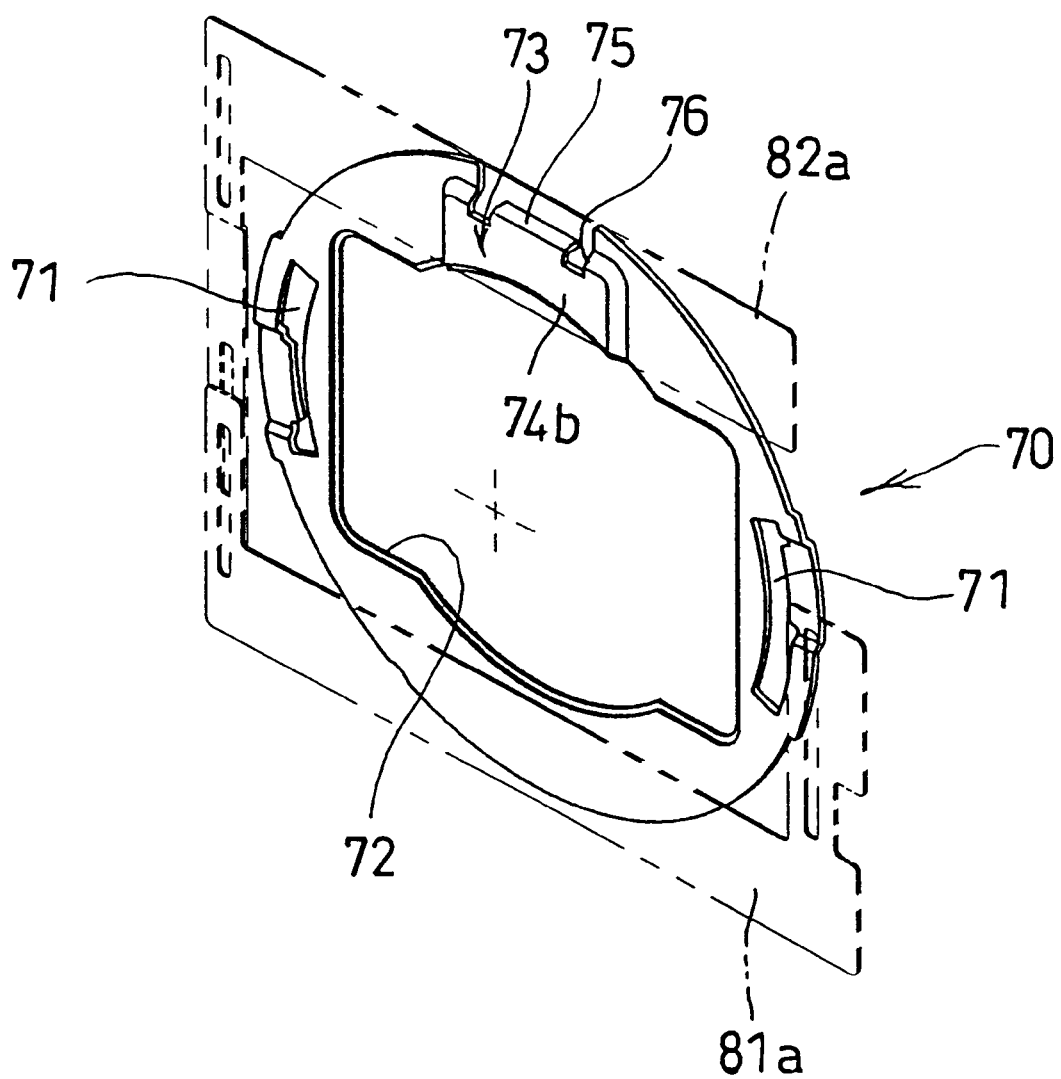

The light-interception plate 70 will be discussed below with reference to FIGS. 4 through 6.

The light-interception plate 70 is secured to the rear end of the first linear movement guide ring 20 through a pair of mounting holes 71, so that the light-interception plate 70 can be moved together with the first linear movement guide ring 20 in the direction of the optical axis in accordance with the extension movement of the lens barrel. The light-interception plate 70 is provided with a central transparent window (opening) 72 through which light transmitted through the lens groups passes and reaches the aperture 11a. The light-interception plate 70 is equipped with a rearwardly projecting planar portion 73 along one of the major sides of the opening 72. The planar portion 73 is stepped rearward (toward the aperture plate 11) from the plane of the light-interception plate 70. The front and rear surfaces 74a and 74b of the planar portion 73 lie in planes perpendicular to the direction of the movement of the zoom lens barrel 10 (i.e., optical axis direction). The planar portion 73 is also provided with an FPC board receiving surface 75 which is bent forward at the outer edge of the planar portion 73. The light-interception plate 70 is provided with a recess (cutaway portion) 76 which extends in the radial and inward direction from the outer edge of the plate. The FPC board receiving surface 75 is located at the bottom (base end) of the recess 76. The width of the recess 76 is slightly larger than the width of the FPC board 60.

The light-interception plate 70 prevents the FPC board 60 from being loosened. The FPC board 60 is composed of a shutter substrate 61 connected to the shutter block 53 and a code plate substrate 62 connected to an encoder (not shown) to detect the focal length. Note that although the code plate substrate 62 terminates in the first linear movement guide ring 20 and the shutter substrate 61 only extends therefrom, both the code plate substrate 62 and the shutter substrate 61 will be referred to as an FPC board 60.

The support mechanism of the FPC board 60 in the zoom lens barrel 10 is as follows.

The second linear movement guide ring 33 which holds the shutter block 53 is provided, on the inner peripheral surface at the rear end thereof, with an FPC guide plate 63. The first linear movement guide ring 20 is equipped with a through hole 64 whose width is substantially identical to that of the FPC board 60 and an FPC securing plate 65 located in front of the through hole 64. The light-intercep tion plate 70 is secured to the rear end of the first linear movement guide ring 20 at an angular position in which the FPC board receiving surface 75 (and the recess 76) and the through hole 64 are registered with each other. In this state, the FPC board receiving surface 75 of the light-interception plate 70 extends in the axial direction of the first linear movement guide ring 20.

The FPC board 60 consists of a plurality of straight portions which extend along the cylindrical surfaces of the first and second linear movement guide rings 20 and 33 and the stationary barrel 13, and a plurality of U-shaped bent portions provided between the straight portions. Namely, the FPC board 60 is composed of a straight portion (second straight portion) 60a which extends along the inner peripheral surface of the second linear movement guide ring 33 between the shutter block 53 and the FPC guide plate 63, a first U-shaped bent portion 60b which is bent forward at the rear end of the second linear movement guide ring 33, a straight portion (return straight portion) 60c which extends from the first U-shaped bent portion 60b toward the front end of the first linear movement guide ring 20, and a bent portion 60d which is bent rearward along the FPC securing plate 65 at the front end of the first linear movement guide ring 20. The FPC board 60 further includes a straight portion (first straight portion) 60e which extends rearward from the bent portion 60d along the outer surface of the FPC securing plate 65 and extends through the through holes 64 into the inside of the first linear movement guide ring 20, and a second U-shaped bent portion 60f which is bent forward at the end of the straight portion 60e toward the stationary barrel 13. The FPC board 60 is partly adhered at the straight portions 60c and 60e to the inner and outer surfaces of the FPC securing plate 65 by a two-sided adhesive tape.

The FPC board 60 gradually 'unravels' as the length of the straight portions supported by the barrel members is decreased. For instance, in the retracted position shown in FIG. 1, in which the amount of overlapping between the barrel members is maximum, the straight portions 60c and 60e of the FPC board 60 are held between the first linear movement guide ring 20 and the inner drive cam ring 30. Therefore, no unravelling of the FPC board 60 occurs at this stage. When the zoom lens barrel 10 is slightly extended from the retracted position toward the wide angle extremity shown in FIG. 2, the first U-shaped bent portion 60b and the second U-shaped bent portion 60f are slightly projected rearward from the first and second linear movement guide rings 20 and 33, however, since there is a large amount of overlapping between the barrel members, the FPC board 60 is not unravelled to the extent that it hangs down toward the optical axis O. Note that at the wide angle extremity, the portion of the FPC board near the second U-shaped bent portion 60f protrudes rearward from the rear end of the first linear movement guide ring 20, and hence the FPC board 60 is guided in the cut-away portion 76 of the light-interce ption plate 70 and is supported by the FPC receiving surface 75.

When further extension of the zoom lens barrel 10 toward the telephoto extremity shown in FIG. 3 takes place, the amount of overlapping between the barrel members is at a minimum. Since the inner barrel member is extended forward, the portion of the FPC board 60 near the rearward U-shaped bent portion tends to unravel. However, in the present invention, since the FPC board 60 is supported by the FPC receiving surface 75 of the light-interception plate 70, so that the straight portion 60e extends at least to the rear terminal end of the second linear movement guide ring 33, no unravelling of the second U-shaped bent portion 60f or the vicinity thereof toward the optical axis O occurs. Note that since the straight portion 60a is supported by the FPC guide plate 63 and the straight portion 60c is secured to the inner surface of the FPC securing plate 65, no unravelling of the first U-shaped bent portion 60b or the vicinity thereof takes place.

The image (plane) size varying frame 80 is provided adjacent to and in front of the aperture plate 11. When the image size varying frame 80 is driven, the standard image size defined by the aperture 11a or the laterally elongated image size (panoramic size) in which the upper and lower edges of the standard size of image plane are cut can be selectively obtained. As shown in FIG. 4, the image size varying frame 80 is made of a pair of L-shaped frame members 81 and 82. The L-shaped frame members 81 and 82 are each provided with a laterally elongated light-interception arm 81a or 82a which extends in parallel with the major sides (upper and lower sides) of the laterally elongated rectangular aperture 11a. The L-shaped frame members 81 and 82 are supported in the camera body 9 to translate up and down.

If the image size changing switch 90 (FIGS. 1 through 3) is moved to the panoramic size position, the L-shaped frame members 81 and 82 are moved up and down in opposite directions in the aperture 11a through an association mechanism 91 per se known. Consequently, the opposed laterally elongated arms 81a and 82a are moved close to each other to partially cut the upper and lower edges of the aperture 11a. In FIG. 4, the image size varying frame 80 corresponding to the standard size is indicated by a solid line and that corresponding to the panoramic size is indicated by a two-dotted and dashed line, respectively. There are overlap areas 81b and 82b (hatched in FIG. 4) in the plane in which the image size varying frame 80 is moved. Parts of the L-shaped frame members 81 and 82 are always located in the overlap areas 81b and 82b regardless of the image size (standard size or panoramic size).

If the retracted position of the zoom lens barrel 10 is shifted rearward from the position shown in FIG. 1, the barrel members may interfere with the image size varying frame 80 so that it would be impossible to switch the image size or the barrel members or the image size varying frame could be broken in the subsequent feed operation (extension operation) of the lens barrel. These problems can be eliminated in the light-interception plate 70 of the present invention. In the retracted position shown in FIG. 1, the rear ends of the first and second linear movement guide rings 20 and 33 are located in rear of the rear ends of the first, second, and third outer barrels 17, 40 and 45. Since the light-interception plate 70 is secured to the rear end of the first linear movement guide ring 20, the rearwardly projecting planar portion 73 of the light-interception plate 70 is always located in the rearmost position. As viewed in the direction parallel with the optical axis O, the rear surface 74b of the planar portion 73 is in the overlapping area 82b of the laterally elongated arm 82a. Namely, the rear surface 74b of the planar portion 73 always overlaps a part of the laterally elongated arm 82a of the light-interce ption member 82, regardless of the position of the image size varying frame 80. Consequently, if the retracted position of the zoom lens barrel 10 is slightly deviated rearward from the correct position shown in FIG. 1, the rear surface 74b always comes first into surface contact with the image size varying frame 80 (laterally elongated arm 82a), regardless of the image size varied by the image size varying frame 80. The surface contact of the rear surface 74b with the image size varying frame 80 prevents a member from interfering with the image size varying frame 80. Moreover, it is possible to drive the image size varying frame 80 while keeping the surface contact if the deviation of the retracted position is small. Thus, it is possible to set the retracted position of the zoom lens barrel as close as possible to the aperture 11 in order to reduce the thickness of the camera 5.

The planar portion 73 of the light-interception plate 70 also has the following function.

As can be seen in FIGS. 1 through 3, the planar portion 73 is located on the rearward extension of the first U-shaped bent portion 60b of the FPC board 60 in the direction of the movement of the zoom lens barrel 10. The FPC board 60 tends not to unravel in the direction toward the optical axis O owing to the FPC guide plate 63, etc., as mentioned above. However, the FPC board 60 can be moved in the direction parallel with the optical axis O. For instance, if the first U-shaped bent portion 60b is located in a more rearward position than the position shown in FIG. 1, due to manufacturing error or loosening in the direction of the length thereof, there is a possibility that the first U-shaped bent portion interferes with the image size varying frame 80 unless the planar portion 73 is provided. However, in the present invention, since the front surface 74a of the planar portion 73 receives the first U-shaped bent portion 60b, no contact of the FPC board 60 and the image size varying frame 80 occurs.

As may be understood from the above discussion, it is possible not only to prevent the barrel members from interfering with the image size varying frame 80 but also to prevent the FPC board from loosening by a simple structure in which the rearwardly projecting planar portion 73 and the FPC receiving surface 75 are provided on the light-intercept ion plate 70 secured to the rear end of the first linear movement guide ring 20. Consequently, the space defined between the image size varying frame 80 and the movable portion of the lens barrel can be reduced to thereby reduce the thickness of the camera 5. Moreover, no special pull mechanism for supporting the FPC board is needed, thus resulting in a realization of a simple lens barrel.

As can be seen from the foregoing, according to the present invention, a simple zoom lens camera in which it is possible not only to prevent the barrel members from interfering with the image size varying frame but also to prevent the FPC board loosening by a simple and small mechanism can be obtained.

What is claimed is:

1. A zoom lens camera comprising:

an aperture frame having an aperture that defines a standard image size;

an image size varying frame which is provided in front of said aperture frame which is moved in a predetermined direction to interrupt a part of the aperture to thereby switch the image size between said standard image size and a laterally elongated image size;

a linear movement barrel provided in a lens barrel of said zoom lens camera, said linear movement barrel being movable in the direction of the optical axis in front of said image size varying frame;

an FPC board which connects a shutter unit provided in said lens barrel and a controller provided in a camera body and which is partly supported along the cylindrical surface of the linear movement barrel; and a light-interception plate which is secured to a rear end of said linear movement barrel and which is provided with an opening through which object light passes;

wherein said light-interception plate is provided with a rearwardly projecting planar portion which at least partly overlaps the image size varying frame as viewed in a direction parallel with the optical axis, regardless of the position of the image size varying frame, and wherein, said planar portion being provided with an FPC board receiving portion which supports the FPC board along the cylindrical surface of the linear movement barrel.

2. A zoom lens camera according to claim 1, said rearwardly projecting planar portion lies in a plane normal to the optical axis.

3. A zoom lens camera according to claim 1, wherein said linear movement barrel is a first linear movement barrel which is guided by said camera body to move linearly, and said lens barrel further comprises a second linear movement barrel which is guided in the first linear movement barrel to move linearly, said FPC board comprises a first straight portion which extends forward along the inner peripheral surface of the first linear movement barrel, a return straight portion which is bent rearward at the front end of the first straight portion and extends linearly, a second straight portion which extends along the inner peripheral surface of the second linear movement barrel, and a U-shaped portion which connects said return straight portion and said second straight portion and which protrudes rearward from said second straight barrel, said planar portion of the light-interception plate being located on a rearward extension of the U-shaped portion of the FPC board.

4. A zoom lens camera according to claim 1, wherein said FPC board receiving portion comprises a cut-away portion which extends in the radial and inward direction from the outer edge of the light-interception plate and an FPC board receiving surface which is provided at the base end of the cut-away portion and which lies in a plane parallel with the optical axis.

5. A zoom lens camera comprising:

an image size varying frame to switch an image size between a standard image size and a laterally elongated image size;

a linear movement barrel that is movable in the direction of the optical axis in front of said image size varying frame;

an FPC board that connects a shutter unit provided in a lens barrel and a controller provided in a camera body, a part of said FPC board being supported along a cylindrical surface of said linear movement barrel;

a light-interception plate that is secured to a rear end of said linear movement barrel;

a rearwardly projecting planar portion that is provided on said light-interception plate, said rearwardly projecting planer portion being located at a place where the rearwardly projecting planer portion can abut against the image size varying frame when said linear movement barrel moves toward the image size varying frame, regardless of the position of the image size varying frame; and an FPC board receiving portion provided on said planar portion, said FPC board receiving portion supporting the FPC board along the cylindrical surface of the linear movement barrel.

* * * * *